(12) United States Patent
Vogel

(10) Patent No.: US 6,839,352 B1
(45) Date of Patent: *Jan. 4, 2005

(54) SONET PHYSICAL LAYER DEVICE HAVING ATM AND PPP INTERFACES

(75) Inventor: Danny C. Vogel, Norfolk, MA (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/464,267

(22) Filed: Dec. 17, 1999

Related U.S. Application Data

(63) Continuation of application No. 08/867,249, filed on Jun. 2, 1997, now Pat. No. 6,075,788.

(51) Int. Cl.[7] .............................. H04L 12/28; H04J 3/16; H04J 3/24
(52) U.S. Cl. ..................... 370/395.1; 370/466; 370/474; 370/907
(58) Field of Search ......................... 370/395.1, 395.52, 370/401, 465–467, 419, 473–474, 907

(56) References Cited

U.S. PATENT DOCUMENTS

| | | | |
|---|---|---|---|
| 5,375,121 A | | 12/1994 | Nishino et al. ............. 370/473 |
| 5,414,707 A | | 5/1995 | Johnston et al. ............ 370/395 |
| 5,600,650 A | | 2/1997 | Oskouy ....................... 370/468 |
| 5,625,625 A | * | 4/1997 | Oskouy et al. ........... 370/395.4 |
| 5,717,690 A | | 2/1998 | Peirce, Jr. et al. .......... 370/389 |
| 5,742,762 A | * | 4/1998 | Scholl et al. ............... 709/200 |
| 5,748,630 A | * | 5/1998 | Bergantino et al. ......... 370/412 |
| 5,781,320 A | | 7/1998 | Byers .......................... 359/123 |
| 5,835,036 A | | 11/1998 | Takefman .................... 370/509 |
| 5,835,602 A | | 11/1998 | Lang ............................ 380/49 |
| 6,041,043 A | * | 3/2000 | Denton et al. .............. 370/254 |
| 6,075,788 A | * | 6/2000 | Vogel .................... 370/395.51 |
| 6,343,086 B1 | * | 1/2002 | Katz et al. .................. 370/489 |

OTHER PUBLICATIONS

RFC 1619—Network Working Group W. Simpson Request for Comments: 1619 Daydreamer Category, "PPP over SONET/SDH" (May 1994), —http://andrew2.andrew.cmu.edu/rfc/rfc1619.html.
RFC 1549—Network Working Group W. Simpson, Editor Request for Comments: 1549 Daydreamer Category, PPP in HDLC Framing, (Dec. 1993), —http://andrew2.andrew.cmu.edu/rfc/rfc1549.html.
LSI LOGIC Promotion, "SONET/SDH Interface Core", (R20005 1995).

* cited by examiner

*Primary Examiner*—Andy Lee
(74) *Attorney, Agent, or Firm*—Westman, Champlin & Kelly

(57) ABSTRACT

A single-chip synchronous optical network (SONET) physical layer device includes first, second and third interface ports. An asynchronous transfer mode (ATM) interface circuit is coupled to the first interface port. A point-to-point protocol (PPP) processing circuit is coupled to the second interface port and the ATM interface circuit. A SONET framer circuit is coupled between the ATM interface circuit and the third interface port and between the PPP processing circuit and the third interface port. The device is programmable to allow multiple standard and non-standard data transmission modes, including transmitting ATM cells in SONET payloads, PPP frames in ATM cells in SONET payloads, PPP frames from a UTOPIA interface in SONET payloads and PPP frames directly in SONET payloads.

12 Claims, 2 Drawing Sheets

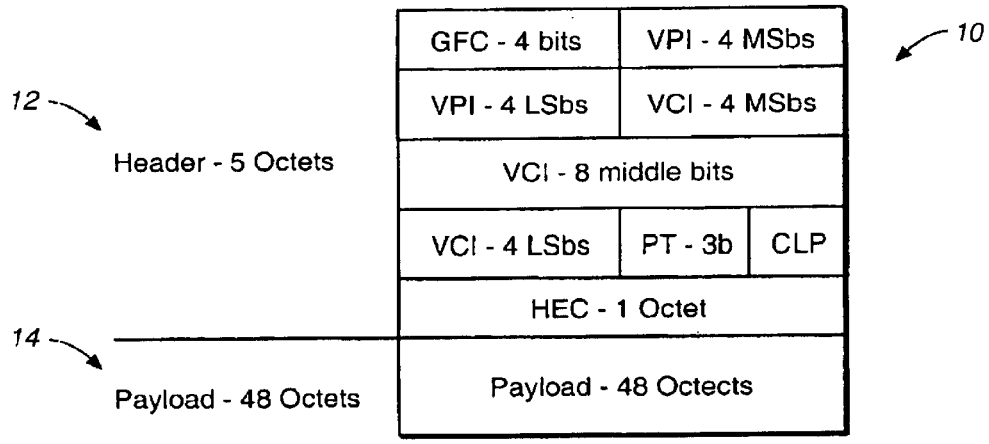
FIG._1
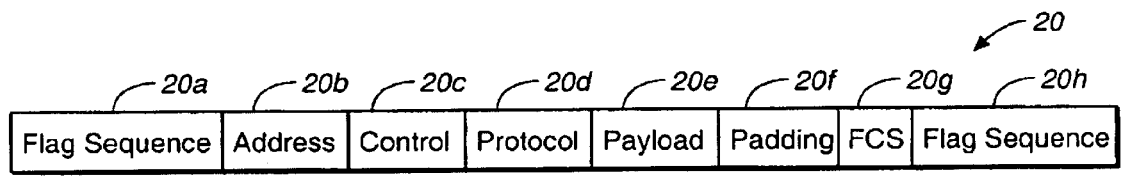
FIG._2
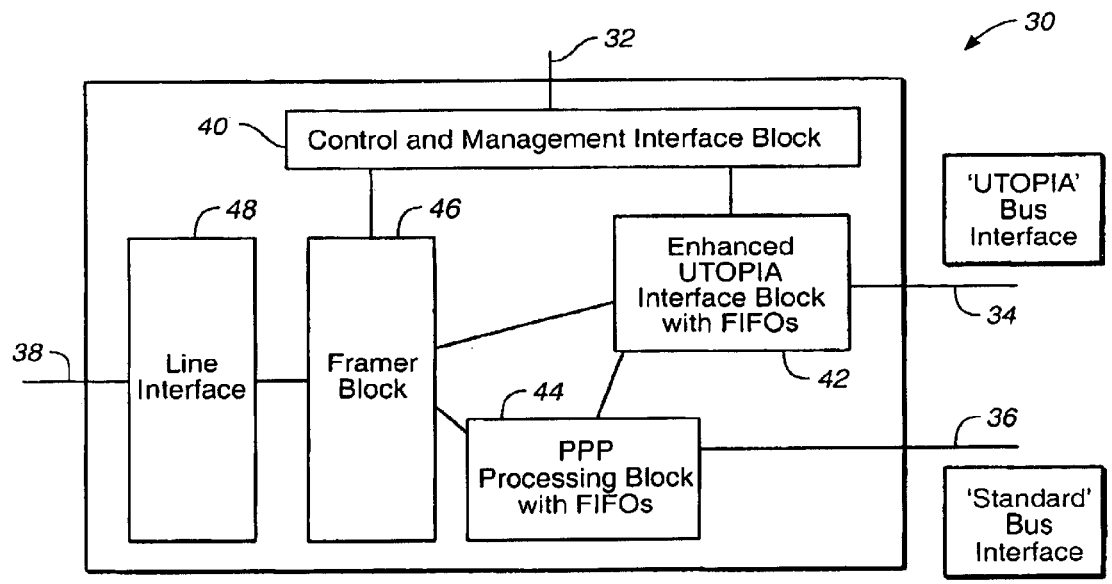
FIG._3

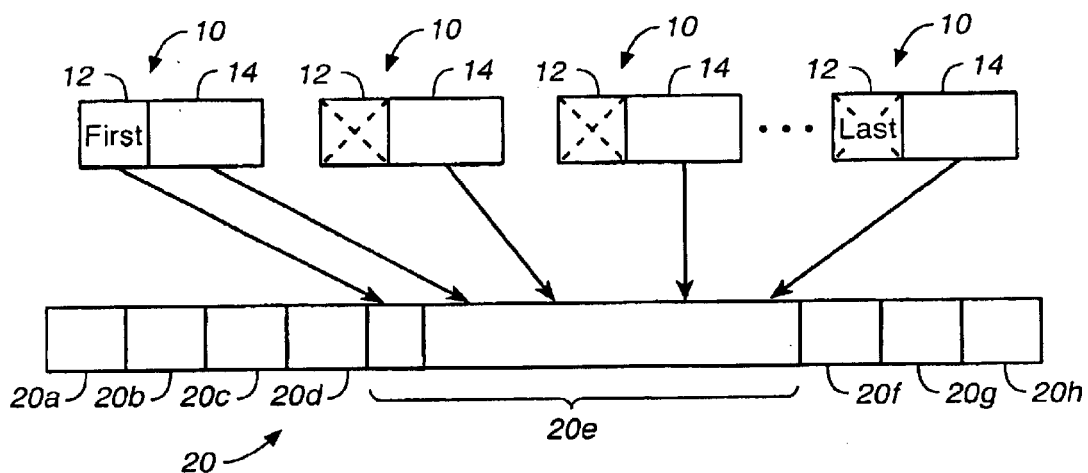
FIG._4
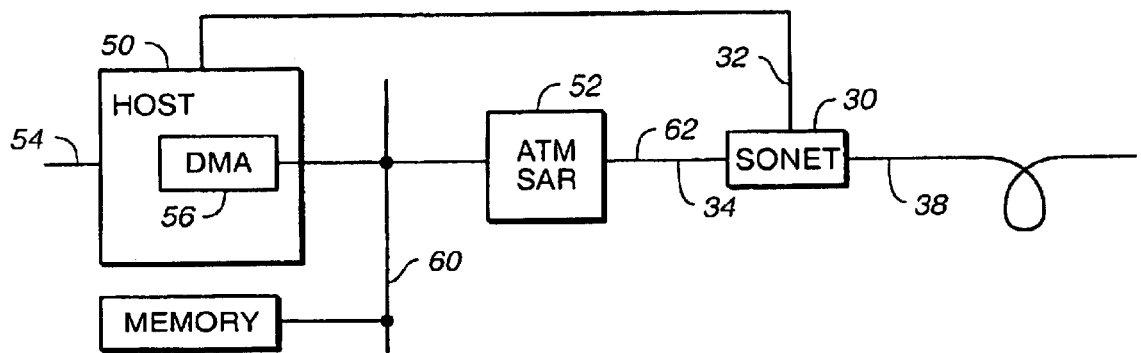
FIG._5
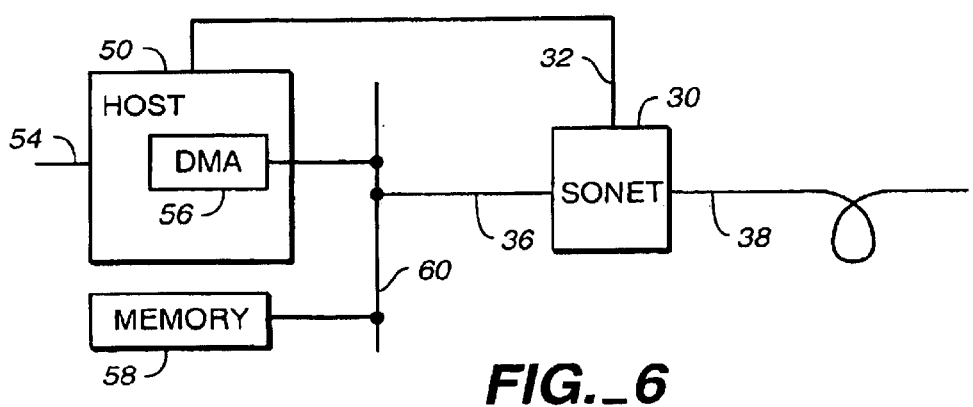
FIG._6

SONET PHYSICAL LAYER DEVICE HAVING ATM AND PPP INTERFACES

This is a continuation of U.S. patent application Ser. No. 08/867,249, filed Jun. 2, 1997 and entitled, "SONET PHYSICAL LAYER DEVICE HAVING ATM AND PPP INTERFACES", now issued as U.S. Pat. No. 6,075,788.

BACKGROUND OF THE INVENTION

The present invention relates to a single-chip SONET physical layer device and, more particularly, to a device which supports the ATM cell protocol and the PPP protocol, while interfacing to common existing components.

A Synchronous Optical NETwork (SONET) is an optical signaling format defined for North America. The international Synchronous Digital Hierarchy (SDH) is closely related to the SONET signaling format, and the term "SONET" will be used in the following specification to refer to both SONET and SDH. A SONET STS-1 data frame consists of 9 rows of 90 octets each, for a total j of 810 octets. An octet is a unit of information consisting of 8 digital bits. The term byte is typically used interchangeably with the term octet. The SONET STS-1 data frame is divided into two fields, a section and line overhead field and a synchronous payload envelope (SPE) field. The section and line overhead field includes 27 octets. The SPE field includes 783 octets of payload and 9 octets of path overhead.

Current data packet transmissions over SONET communication links are typically based upon the Asynchronous Transfer Mode (ATM) cell protocol in which ATM cells are placed into a SONET SPE and transmitted over a SONET communications link. Alternative modes of transmission are being defined using the point-to-point protocol (PPP). A standard ATM cell consists of 53 octets, which includes a 5-octet header field and a 48 octet payload field. The ATM cells "flow" along a physical medium, such as an OC-3 optical fiber or a similar carrier. The ATM cells are used for carrying data, such as data files, between two networked PCs or voice data (voice conversations) along multiple telephone lines between two large telephone distribution points. Since data files and digitized telephone conversations are typically larger than the 48 octets that would fit into the ATM cell payload field, it is necessary to repackage the data in some form. The device that performs the repackaging is referred to as an ATM adaption layer (AAL). The AAL segments the data, which is typically referred to as a protocol data unit (PDU), into 48 octet-sized pieces that fit into the ATM cell payload fields. Different types of AALs exist to segment PDUs in different ways, with each type being appropriate for a particular application. For example, AAL1 is typically used for voice traffic while AAL5 is typically used for file transfer and Ethernet traffic.

The PPP protocol is a High Level Data Link Controller (HDLC) based protocol. The PPP protocol is a popular and practical protocol for moving data traffic between two computer systems. The most typical use of the PPP protocol is for computer dial-up communication with an Internet Service Provider (ISP) over telephone lines. With a Windows®95 based personal computer, this dial-up connection is typically a PPP connection, since the PPP protocol support is built into Windows®95. The PPP protocol consists of a data framing specification and a management protocol. PPP can be implemented with 8-bit asynchronous links, bit-synchronous links or octet-synchronous links. With octet-synchronous links, all operations are based on complete octets and individual bits are not operated on, nor inserted.

A PPP data frame of this type includes several fields, including start flag, address, control, protocol, payload, error correction and end flag fields. The payload field typically consists of 0 to 1,500 octets.

Several transmission methodologies exist for transmitting ATM and PPP over SONET communication links. These methodologies include transmitting ATM cells in SONET SPEs, transmitting PPP frames in ATM cells in SONET SPEs, and transmitting PPP frames directly in SONET SPEs. Transmitting ATM cells in SONET SPEs is a current market norm. The data unit or frame to be transmitted is segmented by an ATM adaption layer device into multiple ATM cells and then transmitted to a SONET physical layer device. The SONET physical layer device receives the ATM cells and places them into the SONET SPE for transmission over a SONET communications link. A typical component for receiving ATM cells and placing the cells in SONET SPEs is the S/UNI Lite available from PMC-SIERRA, Inc.

Transmitting PPP frames in ATM cells in SONET SPEs is a non-standard transmission mechanism. The data unit to be transmitted is processed into a PPP, frame using a form of an HDLC processor in the octet-synchronous mode. The resulting PPP frame is passed to an ATM adaption layer device which segments the PPP frame and places the segments into ATM cells, either in a standard manner or in a non-standard manner by placing the segments into both the cell payload field and the cell header field (excluding an HEC byte). The later is a more typical approach as it increases utilization of the link. The resulting cells are passed to a. SONET physical layer device and placed into a SONET SPE. All header processing is disabled. The S/UNI part can operate in this manner using a diagnostic mode.

Finally, transmitting PPP frames directly in SONET SPEs was proposed in Internet Engineering Task Force (IETF) Request For Comment (RFC) 1619, entitled "PPP over SONET/SDH" by W. Simpson. The data frame to be transmitted is processed into a PPP frame by an HDLC based controller and then loaded directly into a SONET SPE. This methodology increases the utilization of the link in two ways. First, the ATM cell header overhead is eliminated. Second, the overhead due to unused ATM cell space is eliminated. Implementation of this methodology currently requires multiple numbers of components.

The PPP over SONET transmission approach provides dramatic improvements in utilization of the bandwidth of the physical link. These improvements can go from approximately 60%–90% of bandwidth utilization for actual data transfer. This represents a 50% improvement of bandwidth utilization. However, multiple parts are required to implement PPP over SONET, which increases board space, increases cost and requires a non-standard implementation due to a lack of conforming parts. In addition, there is a lack of ability to readily switch between standard and non-standard transmission modes.

SUMMARY OF THE INVENTION

The single-chip Synchronous Optical NETwork (SONET) physical layer device of the present invention includes first, second and third interface ports. An asynchronous transfer mode (ATM) interface circuit is coupled to the first interface port. A point-to-point protocol (PPP) processing circuit is coupled to the second interface port and the ATM interface circuit. A SONET framer circuit is coupled between the ATM interface circuit and the third interface port and between the PPP processing circuit and the third interface port.

The device is programmable to allow multiple standard and non-standard data transmission modes, including: 1) transmitting ATM cells in SONET payloads or PPP frames in ATM cells in SONET payloads; 2) PPP frames from a UTOPIA interface in SONET payloads; and 3) PPP frames directly in SONET payloads. In the first transmission mode, the ATM interface circuit sequentially receives a plurality of ATM cells from the first interface port and passes the ATM cells to the SONET framer circuit. The SONET framer circuit forms a SONET frame having a synchronous payload envelope (SPE), places the plurality of ATM cells into the SPE and passes the SONET frame to the third interface port. The first transmission mode can also transmit PPP frames in ATM cells in SONET payloads. A PPP frame is segmented into the cell payload fields of the plurality of ATM cells. The ATM interface circuit receives the plurality of ATM cells from the first interface port and passes the cells, carrying the PPP frame, to the SONET framer circuit for transmission within a SONET SPE in a similar manner as traditional ATM cells.

In the second transmission mode, a data unit is segmented into the cell payloads fields of the plurality of ATM cells. The ATM interface circuit receives the plurality of ATM cells from the first interface port and extracts the data unit by removing the cell header fields from all but one of the plurality of ATM cells. Saving one of the cell header fields allows the cell header fields of the other ATM cells to be recreated at a far end of the communication link. The ATM interface circuit passes the extracted data unit and the remaining cell header field to the PPP processing circuit. The PPP processing circuit forms a PPP frame having a PPP payload field and places the cell header field and the extracted data unit in the PPP payload field. The PPP processing circuit then passes the PPP frame to the SONET framer circuit, which places the PPP frame into the SPE of a SONET frame for transmission through the third interface port.

In the third transmission mode, the PPP processing circuit receives a data unit from the second interface port, forms a PPP frame and places the data unit in the PPP payload field of the PPP frame. The PPP processing circuit passes the PPP frame to the SONET framer circuit. The SONET framer circuit forms a SONET frame and loads the PPP frame received from the PPP processing circuit into the SPE for transmission through the third interface port.

In one embodiment, the device further includes a SONET line interface circuit which is coupled between the SONET framer circuit and the third interface port for transmitting and receiving the SONET frames through the third interface port. The SONET physical layer device of the present invention can support a variety of standard and non-standard communications protocols, while interfacing to common existing components over standard interfaces. The device can therefore be configured to implement a particular protocol consistent with the application in which the device is used for maximizing transmission bandwidth.

BRIEF DESCRIPTION OF THE DRAWINGS

FIG. 1 is a diagram illustrating a standard ATM cell.

FIG. 2 is a diagram of a PPP frame.

FIG. 3 is a block diagram of a single-chip SONET physical layer device according to the present invention.

FIG. 4 is a diagram illustrating a stripping function performed by an ATM interface block within the device shown in FIG. 3.

FIGS. 5 and 6 are diagrams illustrating the device shown in FIG. 3 coupled to a host processor for implementing a variety of selectable transmission modes.

DETAILED DESCRIPTION OF THE PREFERRED EMBODIMENTS

The Synchronous Optical NETwork (SONET) physical layer device of the present invention is a single-chip device that enables data to be transmitted over a SONET communications link in a variety of standard and non-standard transmission modes. These transmission modes include transmitting ATM cells in SONET SPEs, transmitting PPP frames in ATM cells in SONET SPEs, transmitting PPP frames from a Universal Test and Operations Interface for ATM (UTOPIA) in SONET SPEs, and transmitting PPP frames directly in SONET SPEs.

FIG. 1 is a diagram illustrating a standard ATM UNI cell 10, which is formed of 53 octets, including a 5-octet header field 12 and a 48-octet payload field 14. The header field includes a 4-bit GFC field, an 8 bit VPI field, a 16-bit VCI field, a 3-bit PT field, a 1-bit CLP field, and an 8-bit HEC field. The GFC (Generic Flow Control) field contains generic flow control bits. The VPI (Virtual Path Identifier) field identifies the path along the wire that the ATM cell belongs to. A path includes several connections. An ATM "wire" may be viewed as a cable consisting of multiple bundles of wire, where each bundle has many individual pairs of communication wires. The path is analogous to the bundle of wires. Physically reconnecting a bundle at the end of the cable changes where all the connections in that bundle go. Similarly, if the ATM cells in an ATM connection are redirected based on the VPI, then all connections within that VPI are redirected. The VCI (Virtual Channel Identifier) field defines the channel number that the ATM cell belongs to. The channel is a single unidirectional circuit between two points. For example, a first channel would be used to send data from point A to point B, while a second channel would be used to send data from point B to point A. The PT (Payload Type) field is used to help identify the type of information contained in the ATM cell. For example, the type of information may be user data or management information. The CLP (Cell Loss Priority) field is used to mark the cell at low priority, and hence removable if cell traffic become too congested. The HEC (Header Error Control) field provides error checking on the other four octets of the ATM cell header. The payload field is the 48 octet ATM cell payload area. Although an ATM UNI cell is shown in FIG. 1, other ATM cell formats cal also be used with the present invention, such as the ATM NNI cell format.

FIG. 2 is a diagram of a PPP frame 20. PPP frame 20 includes a flag sequence field 20a, an address field 20b, a control field 20c, a protocol field 20d, a payload field 20e, an padding field 20f, an FCS field 20g and a flag sequence field 20h. The first Flag sequence field 20a identifies the start of PPP frame 20 and is formed of a single octet, such as 0x7E. Address field 20b is formed of a single octet, such as 0XFF. In a compressed mode, the link control protocol (LCP or management protocol) may drop this field since a PPP connection is always point-to-point and thus an address is not required. Control field 20c is formed of a single octet, such as 0x03, which may also be dropped by the LCP in compressed mode. Protocol field 20d is a 2-octet field identifying the content type of the payload. Payload field 20e includes zero or more octets of data to be transported. The maximum length of payload field 20e is normally 1500 octets, but larger payloads may be negotiated. Padding field 20f allows the payload field to be padded by the sender. FCS field 20g is a frame check sequence field used for implementing a cyclic redundancy check (CRC) over the address, control, protocol and payload fields 20b–20e. FCS field 20g is normally two octets. However, for purposes of transmitting PPP directly over SONET, a 4-octet FCS field is recommended. The specification for the FCS field is given in ISO 3309. The second Flag sequence field 20$h$ identifies the end of the PPP frame and consists of a single octet, 0x7E.

In order to prevent misinterpretation of the data in payload field 20$e$ when the payload field contains octets that are the same as a control value, such as flag sequence, an octet stuffing procedure is used. In the stuffing procedure, each of these octets are replaced with a two octet sequence, consisting of a control escape octet 0x7D followed by the result of exclusive-ORing the octet with the value 0x20. For example, when the octet 0x7E is used in payload field 20$e$, it would be interpreted as a flag sequence and would incorrectly terminate the PPP frame. Instead, the octet 0x7E is replaced the octets 0x7D and 0x9E. This is called octet stuffing since an additional octet was "stuffed" into the data stream to prevent misinterpretation. The octets 0x7D and 0x9E will be received by the far end of the system and will not be interpreted as a flag sequence but instead, the octet 0x7D will be discarded, and the octet 0x9E will be exclusive-OR'ed with 0x20 to recover the original octet 0x7E. Control values that are replaced during octet stuffing include the flag sequence, the control escape and other values that are negotiated when setting up the PPP link.

The term "PPP processing" refers to receiving a protocol data unit, inserting the flag sequence, calculating, checking and inserting the FCS and providing octet stuffing. The remaining fields in the PPP frame are processed typically by firmware.

FIG. 3 is a block diagram of a single-chip SONET physical layer device 30 which is capable of transmitting ATM cells and PPP frames in SONET SPEs in a variety of transmission modes according to the present invention. SONET device 30 includes control port 32, UTOPIA bus interface port 34, a standard bus interface port 36, and a SONET interface port 38. SONET device 30 further includes control and management interface block 40, enhanced UTOPIA interface block 42, PPP processing block 44, SONET framer block 46 and SONET line interface 48. Control and management interface block 40 is coupled between control port 32 and blocks 42, 44, 46 and 48.

Control and management interface block 40 includes a plurality of status registers, programmable control registers and related control logic for initializing the device to operate in one of the selected transmission modes and for otherwise controlling and managing the various blocks within device 30. Enhanced UTOPIA interface block 42 is coupled between UTOPIA bus interface port 34, PPP processing block 44 and SONET framer block 46. PPP processing block is coupled between standard bus interface port 36, enhanced UTOPIA interface block 42 and SONET framer block 46. SONET framer block 46 is coupled to SONET line interface 48, which is coupled to SONET interface port 38.

1. Transmitting ATM cells in SONET SPEs
   a. Standard ATM Mode

In a standard ATM mode, ATM cells are sequentially received from an ATM Segmentation And Reassembly (SAR) processor or cell processor (not shown), for example, through UTOPIA bus interface port 34. Enhanced UTOPIA interface block 42 collects the received ATM cells in an array of storage elements, such as a stack of FIFOs. Once collected, the ATM cells are filtered and buffered in a known manner. The resulting cells are then passed to SONET framer block 46. In one embodiment, enhanced UTOPIA interface block 42 is constructed to conform with the UTOPIA Level 2 standard specified in ATM Forum Document af-phy-0039.00. In another embodiment, enhanced UTOPIA interface block 42 is constructed to conform with the UTOPIA Level 1 standard. Enhanced UTOPIA interface block 42 also includes additional processing circuitry for operating in non-standard transmission modes, as described in greater detail below.

SONET framer block 46 receives the ATM cells from Enhanced UTOPIA interface block 42 and places the cells in the SPE of a SONET frame. In one embodiment of the present invention, SONET framer block 46 is constructed consistent with standards CCITT (ITU) 6.708, 6.709, 6.783 and I.432. The SONET frame is then passed to line interface 48 for transmission through SONET interface port 38. Line interface 48 is responsible for clock generation and recovery during transmit and receive operations. In one embodiment, line interface 48 is constructed consistent with the following standards, ANSI T1.E1.2/92-020R2, T1.M1.3/93-005R1 and ATM Forum atm93-1049r1.4. In another embodiment, line interface 48 is constructed consistent with the "SONET/SDH Interface CMOS Core (SSI)" available from LSI Logic Corporation.

When a SONET frame is received at SONET interface port 38, the reverse path is followed. The received SONET frame is passed through line interface 48 to SONET framer block 46, which extracts the ATM cells from the SONET SPE and passes the extracted ATM cells to Enhanced UTOPIA interface block 42. Enhanced UTOPIA interface block 42 then transmits the ATM cells to the ATM SAR or cell processor (not shown) through UTOPIA bus interface port 34.

b. Transmitting PPP in ATM cells in SONET SPEs

SONET device 30 is also capable of transmitting PPP frames in ATM cells in SONET SPEs. A remote ATM Adaption Layer (not shown) receives a PPP frame, segments the PPP frame into the payload fields of a plurality of ATM cells, and generates the cell headers. The ATM cells are then transmitted sequentially over a UTOPIA bus to UTOPIA bus interface port 34. Enhanced UTOPIA interface block 42 receives the ATM cells and passes the cells to SONET framer block 46 for placement into a SONET SPE and transmission through SONET line interface 48 and SONET interface port 38, as described above. The reverse path is also the same as that described above.

2. Transmitting PPP from a UTOPIA interface in SONET SPEs

In the second transmission mode, device 30 is configured to transmit PPP from a UTOPIA interface within SONET SPEs. This transmission mode allows a standard ATM host processor which has no built-in or external PPP/HDLC capability to communicate with a SONET physical interface over a UTOPIA interface bus, and transmit PPP frames over the SONET communication link. As in the more traditional transmission modes discussed above, the ATM Adaption Layer associated with the host processor segments a protocol data unit to be transmitted into the ATM cell payload fields, forms the ATM cell header fields, and passes the resulting ATM cells to device 30 through UTOPIA bus interface port 34. Enhanced UTOPIA interface block 42 retrieves the protocol data unit from the ATM cell payload fields by stripping away the ATM header fields and optionally saving the ATM header field of one of the ATM cells. The protocol data unit and the optional remaining header field are then passed to PPP processing block 44. In one embodiment, the Enhanced UTOPIA interface block 42 saves the header field of the first ATM cell of the protocol data unit.

FIG. 4 is a diagram illustrating the stripping function performed by UTOPIA interface block 42. The protocol data unit is carried by a set of ATM cells 10, which are sequentially received by block 42. Each of the ATM cells 10 includes a cell header field 12 and a cell payload field 14. Block 42 has control circuitry for identifying the first and last ATM cells of the protocol data unit. Block 42 optionally stores the header field 12 of the first ATM cell 10 and discards the header fields 12 of all subsequent ATM cells 10. The first header field 12 and the extracted protocol data unit are then passed to PPP processing block 44.

PPP processing block 44 temporarily stores the data frame within an array of memory storage elements, such as a FIFO, and forms a PPP frame 20 by placing the first header field 12 and the extracted protocol data unit in payload field 20e. PPP processing block 44 also inserts the flag sequence in frames 20a and 20h, calculates, checks and inserts the FCS in field 20g and provides octet stuffing as described above. The first header field 12 is preferably placed at the front of PPP payload field 20e. This facilitates subsequent recovery of the cell header fields of the remaining ATM cells. Although PPP processing block 44 uses a fixed protocol field 20d, the address and control fields 20b and 20c can be negotiated away. The resulting PPP frame 20 is then passed to SONET framer block 46 and loaded by row into a SONET SPE, creating a large bandwidth gain. Multiple PPP frames can be loaded into a single SONET SPE, and a single PPP frame can be divided between two consecutive SONET SPEs. SONET framer block 46 provides the SONET frames to line interface block 48 for transmission through SONET interface port 38, as described above. In embodiments in which the receiving circuitry does not require recovery of the ATM cells, such as in a pure PPP application, UTOPIA interface block 42 strips the cell header fields from all of the ATM cells.

In the reverse direction, SONET framer block 46 receives a SONET frame from line interface block 48, extracts the PPP frame from the SPE of the SONET, frame and passes the PPP frame to PPP processing block 44. PPP processing block 44 extracts the ATM cell header field from the beginning of the PPP payload field, extracts the protocol data unit from the remainder of the PPP payload field data and provides the ATM cell header and the protocol data unit to enhanced UTOPIA interface block 42. Block 42 segments the protocol data unit into 48 octet sized pieces that fit into the ATM cell payload fields 14. UTOPIA interface block 42 then generates the header fields 12 for each of the ATM cells 10 based on the header field extracted from the PPP payload field. Block 42 then transmits the ATM cells 30 through UTOPIA bus interface port 34.

With this mode of operation, the entire protocol data unit is preferably sent in consecutive ATM cells. Although UTOPIA interface block 42 is constructed consistent with the UTOPIA standards listed above, it has additional circuitry to enable the block to detect the first ATM cell of a protocol data unit, strip out the payload field of each ATM cell, store one of the cell header fields, and detect the last ATM cell of the protocol data unit in order to inform PPP processing block 44 to end the PPP frame. In one embodiment, PPP processing block 4 is constructed consistent with IETF RFC 3548, RFC 1549 and ISO 3309.

Increased performance is possible by enhancing framer block 46 to be able to strip out padding, length and CRC bytes from the ATM AAL5 PDU trailer, prior to PPP processing. By stripping out these bytes, less "overhead" bytes need to be transmitted, thus improving bandwidth efficiency. This effective gain would be a programmable mode specific to AAL5 traffic. This also requires that the receiving end be able to recreate these components. Although this transmission mode is not standard, it interoperates easily with existing host devices, and provides dramatic improvement in bandwidth utilization.

3. Transmitting PPP frames directly in SONET SPEs

The third transmission mode allows a host processor without PPP/HDLC capability to transmit and receive protocol data units in PPP frames within SONET SPEs through device 30. The host processor transmits the address, control and payload fields, including the start and end of frame indications, for a PPP frame over a standard bus to standard bus interface port 36. The host processor receives the same fields in return when receiving a protocol data unit from device 30. In one embodiment, the address and control fields for the PPP frame are negotiated away. PPP processing block 44 of device 30 receives the protocol data unit and the associated fields from standard bus interface port 36, forms a PPP frame as discussed above, and passes the PPP frame to SONET framer block 46. SONET framer block 46 loads the PPP frame into a SONET SPE and passes the SONET frame to line interface block 48 for transmission through SONET interface port 38. SONET framer block 46 is of a type capable of handling streams of data such that a PPP payload can be loaded by row into the SONET SPE.

FIGS. 5 and 6 are diagrams illustrating the SONET physical layer device of the present invention coupled to a host processor for implementing the transmission modes discussed above. In FIG. 5, host processor 50 is coupled to UTOPIA interface port 34 through an ATM SAR device 52. Host processor 50 has a port 54 for transmitting and receiving data units according to a selected protocol. For example, port 54 may be coupled to an Ethernet communications link. Host processor 50 has a DMA controller 56 which stores the protocol data units in memory 58, over bus 60. Host processor 50 also has a control output which is coupled to control port 32 of device 30. Host processor 50 uses the control output for configuring device 30 to operate in one of the selectable transmission modes. For example, with the circuit shown in FIG. 5, device 30 can be programmed to operate in one of the first two transmission modes discussed above, including transmitting ATM cells in SONET SPEs or PPP frames in ATM cells in SONET SPEs, and transmitting PPP frames from a UTOPIA interface in SONET SPEs. With each of these transmission modes, DMA controller 56 retrieves protocol data unit to be transmitted from memory 58 and provides data unit to, ATM SAR circuit 52. ATM SAR circuit 52 segments the data unit into 48 octet-sized pieces that fit into the ATM cell payload fields and generates a header field for each ATM cell. ATM SAR circuit 60 then transmits the ATM cells to UTOPIA bus interface port 34 over UTOPIA bus 62.

In FIG. 6, bus 60 is coupled directly to standard bus interface port 36 of device 30. The same reference numerals are used in FIG. 6 as were used in FIG. 5 for the same or similar elements. The control output of host processor 50 is coupled to control port 32 of device 30, and host processor 50 configures device 30 to transmit PPP frames directly in SONET SPEs. Host processor 50 transmits the address, control and payload fields for a PPP frame over bus 60 through DMA controller 56 and memory 58. Host processor 50 receives the same fields in return when receiving a data unit from device 30. PPP processing block 44 in device 30 receives the data unit and its associated fields through standard bus interface port 36, forms a PPP frame and passes the PPP frame to SONET framer block 46 for transmission in a SONET SPE as discussed above.

5. Conclusion

The SONET physical device of the present invention is constructed on a single integrated circuit, which reduces the board space required to implement the circuit and the resulting cost of its manufacture. The device inter-operates with multiple standard and non-standard data encapsulation mechanisms, and allows packet transmission using the PPP protocol over a SONET communication link for maximum bandwidth utilization.

SONET communication links are expensive and crowded with data traffic. The SONET physical layer device of the present invention allows data traffic to be transported readily in local or campus networks according to RFC 1619 with a large performance gain for little or no increased cost. Independent studies have shown that the protocol data units (PDUs) presented to Frame Relay networks as well as ATM AAL5 layers for transport across ATM networks are almost always one of three sizes, 64 octets, 1500 octets and 384 octets. 64 octets is the size of acknowledgement packets used in Ethernet and other protocols. 1500 octets is the maximum size protocol data unit for non-enhanced Ethernet. 384 octets is the size theorized to be a result of legacy data traffic from protocols with a maximum 384 octet data bit size. This size information was used to calculate efficiency of data transport with the various transmission modes of the present invention.

In the "standard" ATM mode, ATM cells are loaded into a SONET (STS-1) SPE more or less directly. Efficiency of transport of the common data unit sizes in the ATM mode are shown in Table 1:

TABLE 1

| Size of PDU | # of ATM Cells required for Transport | Total Octets in ATM Cells | Octet Efficiency of Cells (Oe) | SONET Efficiency (783* Oe)/810 |
| --- | --- | --- | --- | --- |
| 64 | 2 | 106 | 60.37% | 58.36% |
| 384 | 9 | 477 | 64.81% | 62.65% |
| 1500 | 32 | 1696 | 88.44% | 85.49% |

*Extra ATM Cell required for additional AAL5 overhead bytes

The transport efficiency of a 48-octet payload in a 53-octet ATM cell is 90.57w. This is the number typically quoted for ATM transport systems. However, the decrease in efficiency shown in Table 1 comes from the necessity of adding more protocol layers (the AAL5 layer) to support the various size PDUs and to provide error checking across the PDU. Additional overhead is incurred from mapping the ATM cells into the SONET frame.

Transporting PPP frames in ATM cells over SONET consists of adding the PPP flag sequences, control fields, etc., to the PDU as well as performing byte stuffing. The PPP processed PDU is then segmented into standard ATM cells for transport. For the purposes of the following efficiency calculations, it was assumed that the control overhead could be negotiated down to 7 octets, and that byte stuffing would only be required for 2 octet values uniformly across the PDU (or one out of 128 octets would require stuffing). Table 2 shows the transport efficiency for this mode of operation. In this mode of operation, a layer of PPP processing has been added but there has been no gain in transport efficiency.

TABLE 2

| Size of PDU | Size of PPP Processed PDU | # of ATM Cells Required for Transport | Total Octets in ATM Cells | Octet Efficiency of Cells (Oe) | SONET Efficiency (783*Oe)/810 |
| --- | --- | --- | --- | --- | --- |
| 64 | 72 | 2 | 106 | 60.37% | 58.36% |
| 384 | 394 | 9 | 477 | 64.81% | 62.65% |
| 1500 | 1519 | 32 | 1696 | 88.44% | 85.49% |

Transporting PPP frames from a UTOPIA interface over SONET results in a significant increase in efficiency, as shown in Table 3. The increase in efficiency is gained by stripping the ATM cell headers from the PDU.

TABLE 3

| Size of PDU | Size of PPP Processed PDU (4 bytes added for first ATM cell header) | Octet Efficiency of Cells (Oe) | SONET Efficiency (783*Oe)/810 |
| --- | --- | --- | --- |
| 64 | 76 | 84.21% | 81.40% |
| 384 | 398 | 96.48% | 93.26% |
| 1500 | 1523 | 98.49% | 95.21% |

Transporting PPP direct over SONET results in essentially the same transport efficiencies as those shown in Table 3. The 4 bytes added to recover the ATM cell header in the previous mode of operation would be replaced by another addressing mechanism, but the efficiencies would remain substantially the same. The primary distinction between these two modes of operation is that the ATM segmentation and reassembly function is totally removed, and the data no longer has to pass through the UTOPIA bus interface.

The SONET physical layer device of the present invention can be constructed to operate at different transmission rates, such as STS-1, STS-3C and STS-12, using the same principals. The device can be configured with its surrounding components to operate in one of the selectable transmission modes during board level design or can be programmed during operation. The device can be constructed as a core or a macro within a larger integrated circuit design specification. Also, the device can be constructed with multiplexed bus lines in order to achieve a smaller number of pins on the integrated circuit package. In one embodiment, the device is constructed without a line interface block. In this embodiment, an external line driver is used, which allows the use of varying types of line drivers. In addition, multiple instances, such as four or eight, of the device can be place on a single integrated circuit to provide multiple transmission channels for a line card router, for example.

Although the present invention has been described with reference to preferred embodiments, workers skilled in the art will recognize that changes may be made in form and detail without departing from the spirit and scope of the invention.

What is claimed is:

1. A single-chip Synchronous Optical Network SONET) physical layer device comprising:
    a single integrated circuit comprising first, second and third interface ports;
    an Asynchronous Transfer Mode (ATM) interface circuit fabricated on the single integrated circuit and coupled to the first interface port for receiving a plurality of ATM cells, which together carry a first data unit, from the first interface port;

a Point-to-Point Protocol (PPP) processing circuit fabricated on the single integrated circuit and coupled to the second interface port and the ATM interface circuit for receiving a second data unit from the second interface port or the first data unit from the ATM interface circuit, wherein the PPP processing circuit is adapted to place one of the first data unit and the second data unit into a PPP frame;

a SONET framer circuit fabricated on the single integrated circuit and coupled between the ATM interface circuit and the third interface port and between the PPP processing circuit and the third interface port, wherein the SONET framer circuit is adapted to receive the ATM cells from the ATM interface circuit or the PPP frame from the PPP processing circuit and place the ATM cells or the PPP frame into a SONET frame;

a first transmission path from the first interface port to the ATM interface circuit, through the ATM interface circuit to the SONET framer circuit, and through the SONET framer circuit to the third interface port;

a second transmission path from the first interface port to the atm interface circuit, through the ATM interface circuit to the PPP processing circuit, through the PPP processing circuit to the SONET framer circuit, and through the SONET framer circuit to the third interface port; and a third transmission path from the second interface port to the PPP processing circuit, through the PPP processing circuit to the SONET framer circuit, and through the SONET framer circuit to the third interface port.

2. The single-chip SONET physical layer device of claim 1 wherein the third interface port comprises a SONET interface port and wherein the device further comprises a SONET line interface circuit coupled between the SONET interface port and the SONET framer circuit.

3. The single-chip SONET physical layer device of claim 1 wherein the first interface port comprises a Universal Test and Operations PHY Interface for ATM (UTOPIA) port.

4. The single-chip SONET physical layer device of claim 1 wherein the ATM interface circuit comprises:

means for sequentially receiving the plurality of ATM cells from the first interface port and passing the ATM cells to the SONET framer circuit through the first transmission path.

5. The single-chip SONET physical layer device of claim 4 wherein the SONET framer circuit comprises:

means for forming the SONET frame having a synchronous payload envelope (SPE); and means for receiving the plurality of ATM cells from the ATM interface circuit and for loading the plurality of ATM cells into the SPE.

6. The single-chip SONET physical layer device of claim 1 the ATM interface circuit comprises;

means for sequentially receiving the plurality of ATM cells from the first interface port, wherein each ATM cell has a cell header field and a cell payload field and wherein the cell payload fields of the plurality of ATM cells together form the first data unit;

means for extracting the data unit from the plurality of ATM cells; and means for passing one of the cell header fields and the extracted data unit to the PPP processing circuit along the second transmission path.

7. The single-chip SONET physical layer device of claim 6 wherein the PPP processing circuit comprises:

means for forming the PPP frame having a PPP payload field and for placing the cell header field and the extracted data unit received from the ATM interface circuit in the PPP payload field; and means for passing the PPP frame to the SONET framer circuit along the second transmission path.

8. The single-chip SONET physical layer device of claim 1 wherein the PPP processing circuit comprises:

means for receiving either one of the first data unit from the ATM interface circuit, along the second transmission path, and the second data unit from the second interface port, along the third transmission path;

means for forming the PPP frame having a PPP payload field and for placing the first and second data unit in the PPP payload field; and means for passing the PPP frame to the SONET framer circuit.

9. The single-chip SONET physical layer device of claim 8 wherein the SONET framer circuit comprises;

means for forming the SONET frame having a synchronous payload envelope (SPE); and means for receiving the PPP frame from the PPP processing circuit and for loading at least a portion of the PPP frame into the SPE.

10. The single-chip SONET physical layer device of claim 1 and further comprising multiple instances of the first, second and third interface ports, the ATM interface circuit, the PPP processing circuit and the SONET framer circuit.

11. A single-chip Synchronous Optical Network (SONET) physical layer device comprising:

a single integrated circuit comprising first, second and third interface ports;

Asynchronous Transfer Mode (ATM) interface means fabricated on the single integrated circuit and coupled to the first interface port for sequentially receiving a plurality of ATM cells from the first interface port, wherein each ATM cell has a cell payload field and wherein the cell payload fields of the plurality of ATM cells together form a first data unit;

Point-to-Point Protocol (PPP) processing means fabricated on the single integrated circuit and coupled to the ATM interface means and the second interface port for receiving the first data unit from the ATM interface means in a first transmission mode and a second data unit from the second interface port in a second transmission mode, forming a PPP frame having a PPP payload field and placing the first or second data unit in the PPP payload field; and SONET framing means fabricated on the single integrated circuit coupled to the PPP processing means for receiving the PPP frame from the PPP processing means, forming a SONET frame having a synchronous payload envelope (SPE), loading the PPP frame into the SPE, and passing the SONET frame to the third interface port.

12. The single-chip SONET physical layer device of claim 11 and further comprising line interface means coupled between the SONET framing means and the third interface port for receiving the SONET frame from the SONET framing means and for transmitting the SONET frame through the third interface port.

* * * * *